United States Patent
Wang et al.

[11] Patent Number: 5,883,929
[45] Date of Patent: Mar. 16, 1999

[54] SYNCHRONIZATION METHOD, AND ASSOCIATED CIRCUITRY, FOR SYNCHRONIZING A RECEIVER WITH A TRANSMITTER

[75] Inventors: Y-Pin Eric Wang, Raleigh; Stanley L. Reinhold; Amer A. Hassan, both of Cary; Paul W. Dent, Pittsboro, all of N.C.

[73] Assignee: Ericsson, Inc., Research Triangle Park, N.C.

[21] Appl. No.: 626,807

[22] Filed: Apr. 3, 1996

[51] Int. Cl.$^6$ .................................................. H04L 7/00
[52] U.S. Cl. .......................... 375/367; 370/509; 370/511
[58] Field of Search ................................... 375/367, 354, 375/365, 366; 370/509, 511, 512, 515, 513

[56] References Cited

U.S. PATENT DOCUMENTS

| | | | |
|---|---|---|---|
| 3,798,378 | 3/1974 | Epstein | 179/15 |
| 3,898,390 | 8/1975 | Wells et al. | 179/41 |
| 4,245,345 | 1/1981 | Gitlin et al. | 375/13 |
| 4,276,642 | 6/1981 | Siglow et al. | 370/100 |
| 4,344,180 | 8/1982 | Cummiskey | 375/116 |
| 4,763,339 | 8/1988 | Sutphin et al. | 375/114 |
| 4,800,578 | 1/1989 | Sasaki | 375/116 |
| 5,014,272 | 5/1991 | Yoshida | 370/106 |
| 5,109,393 | 4/1992 | Saegusa | 375/108 |
| 5,321,725 | 6/1994 | Paik et al. | 375/39 |
| 5,335,228 | 8/1994 | Bottiglieri et al. | 370/100.1 |
| 5,343,499 | 8/1994 | Jasper et al. | 375/39 |
| 5,473,612 | 12/1995 | Dehner, Jr. et al. | 370/105.4 |
| 5,509,016 | 4/1996 | Müller | 370/95.3 |
| 5,511,098 | 4/1996 | Gardner | 375/340 |
| 5,590,160 | 12/1996 | Ostman | 375/367 |
| 5,594,506 | 1/1997 | Yang | 348/531 |
| 5,682,404 | 10/1997 | Miller | 375/222 |
| 5,793,756 | 8/1998 | Ayerst et al. | 370/311 |
| 5,809,421 | 9/1998 | Manssen et al. | 455/434 |

FOREIGN PATENT DOCUMENTS

| | | |
|---|---|---|
| 0 556 982 A1 | 8/1993 | European Pat. Off. . |
| 0 629 068 A1 | 12/1994 | European Pat. Off. . |
| 02 246 579 | 4/1992 | Japan . |

OTHER PUBLICATIONS

M. Nakamura, B. Leskovar and B.T. Turko; *Signal Processing for an Optical Wide Band Data Transmission System*; IEEE Transactions on Nuclear Science, vol. 35, No. 1, Feb. 1988; pp. 197–204.

*Primary Examiner*—Stephen Chin
*Assistant Examiner*—Muhammad Ghayour
*Attorney, Agent, or Firm*—Jenkens & Gilchrist, P.C.

[57] ABSTRACT

A synchronization method and apparatus for synchronizing a receiver, such as a radiotelephone operable in a cellular communication system with a transmitter. Synchronization sequences are transmitted as parts of a control signal to the receiver. The synchronization sequences are formed of either a dotting sequence or a set of m-sequences. Such synchronization sequences are of high margins and also permit synchronization of the user terminal responsive to a reduced number of calculations.

20 Claims, 9 Drawing Sheets

SYNCHRONIZATION METHOD, AND ASSOCIATED CIRCUITRY, FOR SYNCHRONIZING A RECEIVER WITH A TRANSMITTER

The present invention relates generally to synchronization methods and apparatus for synchronizing a receiver, such as a radiotelephone operable in a cellular communication system, with a transmitter which transmits signals to the receiver. More particularly, the present invention relates to a synchronization method, and associated circuitry, in which digitally-encoded synchronization sequences are transmitted to the receiver and used by the receiver to synchronize the receiver with the transmitter.

The synchronization sequences are of characteristics which permit their detection by the receiver through a correlation process of reduced complexity. Synchronization of the receiver is effectuated quickly as only a reduced number of calculations is required to detect the synchronization sequences.

The synchronization sequences are of high margin to facilitate their detection by the receiver even when the sequences are transmitted upon a communication channel subjected to high levels of attenuation or multi-path distortion. Because the synchronization sequences are digitally-encoded, sequences can be transmitted in a time division multiplex (TDM) communication scheme, such as those used in several, conventional, cellular communication systems. The present invention is, therefore, advantageously embodied in a cellular communication system, such as a terrestrial-cellular communication system or a satellite-cellular communication system. When transmitted during selected time slots to form portions of a control signal generated on control channels by a cellular network station to a radio telephone, the radiotelephone, responsive to detection of the synchronization sequences, becomes synchronized to the transmitter, both to receive other portions of the control signal and other signals generated upon other data or voice channels.

BACKGROUND OF THE INVENTION

A communication system is formed, at a minimum, by transmitter and a receiver interconnected by a communication channel. Communication signals transmitted by the transmitter are transmitted upon the communication channel to be received by the receiver.

A radio communication system is a communication system in which the communication channel is formed of one or more frequency bands of the electromagnetic frequency spectrum. Because a fixed or hard-wired connection is not required to be formed between the transmitter and the receiver, a radio communication system is advantageously utilized when the use of such fixed or hard-wired connections would be inconvenient or impractical.

A cellular communication system is a type of radio communication system. When the infrastructure, hereinafter referred to as the network, of the cellular communication system is installed throughout a geographical area, a subscriber to the cellular system is generally able to communicate telephonically in the system when positioned at any location in the geographical area encompassed by the system.

While conventional, terrestrial-cellular communication networks have been installed throughout significant portions of the world, some areas are without such networks. In areas of low population density, for instance, a terrestrial-cellular communication network might not be commercially viable. Also, existing, terrestrial-cellular networks have also been constructed pursuant to various different standards.

A radiotelephone, sometimes hereinafter referred to also as a "user terminal", operable in one of the communication systems is sometimes not operable in others of the cellular communication systems. Even in an area in which a cellular communication network has been installed, a user might not be able to communicate pursuant thereto if the user attempts to utilize a user terminal constructed to be operable only with another one of the cellular communication networks.

Satellite-cellular communication systems have been proposed which, when implemented, shall permit a user to communicate telephonically by way of the satellite-cellular communication system when positioned at almost any location. By transmitting down-link signals between a satellite-based transceiver and the user terminal and up-link signals between the user terminal and the satellite-based transceiver, telephonic communication shall be possible between the user terminal and the satellite-based transceiver. By effectuating additional communication links between the satellite-based transceiver and a ground station, the user of the user terminal shall be able to communicate telephonically with another party by way of the ground station and the satellite-based transceiver.

Because of the inherent efficiencies of digital communication techniques, many already-installed cellular communication networks have been converted, and many newly-proposed cellular communication systems are being designed, to utilize digital communication techniques. Other communication systems similarly utilize, or are planned to be converted to or to utilize, digital communication techniques.

To function properly, particularly when the communication system utilizes digital communication techniques, the user terminal must be synchronized with a network station of the cellular communication network. Conventionally, synchronization sequences are transmitted by the network station to the user terminal to synchronize the user terminal with the network station. Other communication systems similarly utilize conventional, synchronization sequences for similar purposes.

Synchronization of the user terminal with a transmitter which transmits the synchronizing sequences thereto typically requires a significant number of processing steps to be performed. A correlation is typically performed between signals received by the receiver and a stored synchronization word. When a sequence of symbol bits of the received signal exhibits a high correlation with the stored synchronization word, a determination is made that such received symbol bits form the synchronization sequence transmitted to the receiver. Synchronization of the receiver with the network station is thereby effectuated when the format of the signal transmitted to the receiver is known. That is to say, when the synchronization sequence is transmitted to the receiver according to a known format, locations of other signal components of signals transmitted to the receiver can be determined once the location of the synchronization sequences are determined.

Conventionally, groups of received symbol bits are each correlated with the stored synchronization word. Conventionally, to determine the correlation of the received symbol bits with the stored synchronization word requires a first-order number, N, of calculations to be performed upon each group of symbol bits. The number of processing steps required to perform correlations upon each group of symbol bits received by the receiver quickly becomes a very significant number, requiring a significant amount of processing to determine the reception of the synchronization sequences.

When the signals transmitted to the receiver are subjected to high levels of attenuation or multi-path distortion, detection of the synchronization sequences is more difficult as the synchronization sequences might be distorted or attenuated during their transmission to the receiver.

Any manner by which to provide a high margin synchronization sequence to a receiver to permit the receiver to become synchronized with a transmitter while requiring a lesser number of processing steps to be performed would be advantageous.

It is in light of this background information related to synchronization of a receiver with a transmitter, such as a user terminal of a cellular communication system, that the significant improvements of the present invention have evolved.

SUMMARY OF THE INVENTION

The present invention advantageously provides a synchronization method, and associated circuitry, for synchronizing a receiver with a transmitter, such as a user terminal operable in a cellular communication system.

Digitally-encoded synchronization sequences are transmitted by the transmitter to the receiver. The receiver synchronizes itself to the synchronization sequences which are transmitted pursuant to a selected format. The synchronization sequences are of characteristics which permit their detection by the receiver through a correlation process of reduced complexity. Synchronization of the receiver is effectuated quickly and simply as only a reduced number of calculations are required to detect the synchronization sequences.

The synchronization sequences are of high-margin characteristics to facilitate their detection by the receiver, even when transmitted upon a communication channel which exhibits high levels of attenuation or multi-path distortion.

The circuitry and its associated synchronization method of the present invention are advantageously utilized in a cellular communication system to synchronize user terminals operable therein to a network station. In a terrestrial-cellular communication system, the synchronizing sequences are transmitted to the user terminal as portions of a control signal generated at a cellular base station. In a satellite-cellular communication system, the synchronizing sequences form portions of a control signal generated at a network control center and are transmitted to the user terminal by way of a satellite-based transceiver.

In one aspect of the present invention, the synchronization sequences are formed of a dotting sequence. The dotting sequence can be considered to be formed of an odd function divisible into two portions which are concatenated together. The two portions into which the dotting sequence can be considered to be divisible may be of dissimilar bit lengths. In another aspect of the present invention, the synchronization sequence includes two m-sequences of substantially identical values. The two m-sequences are concatenated together, each m-sequence forming a portion of the synchronization sequence. The synchronization sequences are transmitted during selected time slots spaced apart amongst groups of frames which together form a multi-frame. By detecting the synchronization sequence and its location within a multi-frame, the user terminal becomes synchronized with the network station which transmits the synchronization signals thereto.

In these and other aspects, therefore, a method, and associated circuitry, synchronizes a receiver with a transmitter. The receiver and the transmitter are coupled together by way of a communication channel. A control signal is transmitted from the transmitter upon the communication channel. The control signal is formatted pursuant to a selected format and includes synchronization sequences, each synchronization sequence formed of a first synchronization portion and a second synchronization portion concatenated thereto and substantially identical therewith. The control signal is detected at the receiver, and portions of the control signal detected at the receiver are correlated. The portions of the control signal exhibiting increased levels of correlation are selected to form the synchronization sequences formatted to form portions of the control signal, thereby to synchronize the receiver with the transmitter and the control signal transmitted therefrom.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
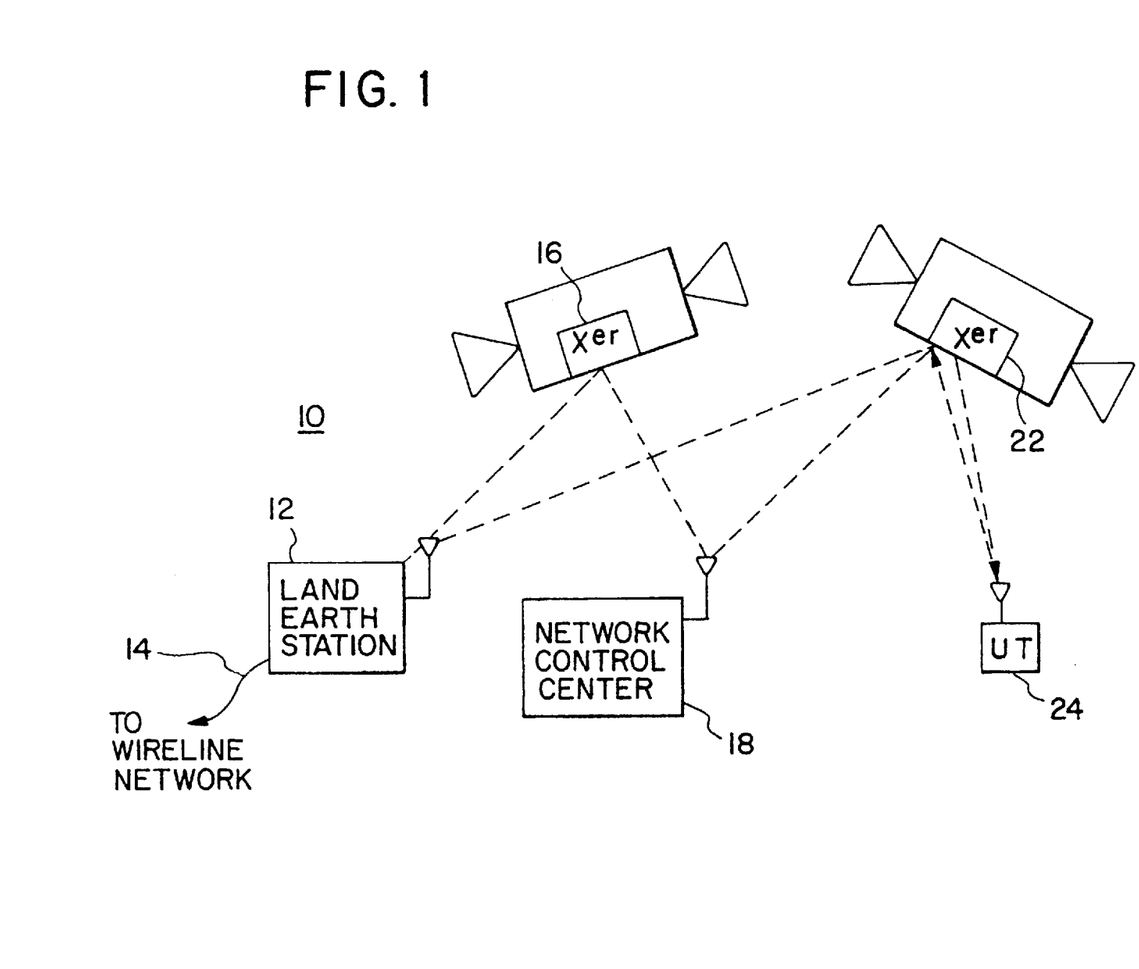
FIG. 1 illustrates a functional block diagram of a satellite-cellular communication system which embodies the circuitry and method of an embodiment of the present invention.

Referring first to FIG. 1, a satellite-cellular communication system, shown generally at 10, includes the circuitry, and carries out the methodology, of an embodiment of the present invention. While the communication system 10 of the illustrated embodiment forms a satellite-cellular communication system, it should be understood at the outset that the circuitry and methodology of the present invention can analogously be embodied in other types of communication systems, including, for instance, a terrestrial-cellular communication system or other type of radiotelephonic communication system.

The communication system 10 includes a land earth station 12 coupled to a wireline telephonic network. Such coupling is represented in the figure by the lines 14 extending from the land earth station 12.

The land earth station 12 includes transceiver circuitry for transceiving communication signals, inter alia, with a satellite-based transceiver 16. The satellite-based transceiver is operable to transceive communication signals not only with the land earth station 12 but also with other land-based devices, such as the transceiver circuitry of a network control center 18. The transceiver 16 is here operable primarily as a relay station for relaying signals generated at the land earth station 12 to the network control center 18 and vice-versa. The transceiver 16 preferably further includes control circuitry permitting the frequency channels upon which the signals transmitted to the transceiver 16 to be relayed therefrom to be altered to utilize most efficiently thereby the frequency channels allocated for communication in the communication system 10.

Transceiver circuitry of the network control center 18, in turn, is able to transceive communication signals with other satellite-based transceivers, such as the transceiver 22. The transceiver 22, similar to the transceiver 16 transceives communication signals with land-based transceivers including, for example, a user terminal 24. Again, the transceiver 22 is primarily operable to relay communication signals transmitted thereto and again preferably includes control circuitry for selecting the frequency channels upon which signals transmitted thereto are relayed to other communication stations.

Communication pursuant to the communication system 10 permits a user of a user terminal, such as the user terminal 24, to communicate telephonically when positioned at any location throughout large areas of the world. As long as the user of the user terminal 24 is positioned to permit transmission and reception of communication signals with a satellite-based transceiver, the user is able to communicate telephonically with a user of another user terminal or to a telephonic device of a conventional, wireline network.

To operate properly, the user terminal 24 must be synchronized with the cellular network. Once properly synchronized, voice, or other, communications can be effectuated between the user terminal and the cellular network.

As mentioned previously, an existing manner by which to effectuate synchronization between a receiver, such as the user terminal 24, and a transmitting station, such as the cellular network, has been to transmit synchronization sequences according to a known format to the receiver, again, such as the user terminal 24. By detecting the transmission thereto of the synchronization sequences, synchronization can be effectuated. However, detection of the synchronization sequences requires significant numbers of processing steps to correlate the received data with a stored synchronization word. Such a required number of processing steps is processor-intensive.

Also, when the synchronization sequences must be transmitted upon a communication channel which exhibits significant levels of attenuation or multi-path distortion, the synchronization sequences transmitted upon such a communication channel might be significantly distorted or attenuated. When operating in such an environment, the synchronization sequence must be of a high margin to ensure adequate transmission to a receiver.

A satellite communication system, of which the communication system 10 is exemplary, is a communication system in which significant power restraints limit the power levels of signals transmitted between the network of the communication system and the user terminal 24. Therefore, a signal to noise power ratio, C/N, is typically of a relatively low value. If an antenna at the user terminal is not oriented to detect best signals transmitted thereto, the signal to noise ratio of signals actually received by the user terminal are even further reduced. In at least one proposed, satellite-cellular communication system, paging signals are required to be transmitted at a margin of thirty decibels over average white gaussian noise (AWGN). Such a requirement corresponds, generally, in a user terminal of sensitivity to detect a paging signal having a C/N ratio of about minus ten decibels. As a user terminal must be synchronized with the cellular network to receive properly the paging signal, the communication system requires a high margin synchronization capability.

An embodiment of the present invention provides high power synchronization (HPS) bursts which are transmitted to a user terminal to permit the user terminal to become synchronized with the network. In one embodiment of the present invention, synchronization is a two-step process. Coarse synchronization is first effectuated; thereafter, fine synchronization is effectuated. During coarse synchronization, HPS bursts permit synchronization of the user terminal to a first level of synchronization. And, during fine synchronization, acquisition to within a single symbol bit is possible; also, more precise frequency offset is provided.

When the user terminal is turned on, the terminal begins a coarse synchronization procedure. The coarse synchronization process reduces the time (and frequency) uncertainty to a selected level to permit thereafter the number of operations required to perform fine synchronization to be reduced. In one embodiment, the user terminal searches all possible primary carriers when the user terminal is turned on. A primary carrier is the carrier which multiplexes the control channels. In another embodiment, the user terminal is assumed to have pre-registered in a region using the nominal control channels prior to receiving paging signals.

In either embodiment, system synchronization is effectuated by utilizing high power bursts which include predetermined patterns forming synchronization sequences. The bursts are time-multiplexed with other control channels and traffic channels. The synchronization sequences are of characteristics which both permit simplified correlation operations to be performed to form correlation values of the received signals and additionally to permit the received signals to be added coherently to increase the processing gain thereof prior to application of the receive signal to a power detector.

Figure 2:
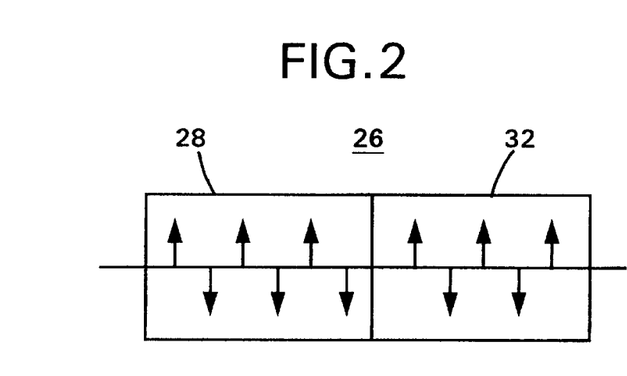
FIG. 2 illustrates a dotting sequence used to form a synchronization sequence in an embodiment of the present invention.

FIG. 2 illustrates a dotting sequence, shown generally at 26, which forms the synchronization sequence of one embodiment of the present invention. The dotting sequence 26 can be considered to form an odd function having a first portion 28 and a second portion 32 concatenated thereto. The first and second portions 28 and 32 are substantially identical to one another.

The dotting sequence Is described by the equation:

$$(d_i)_{i=1}^{N}$$

Wherein:

$$d = \begin{matrix} 1 & i \text{ is odd} \\ -1 & i \text{ is even} \end{matrix}$$

In one embodiment, the dotting sequence is transmitted during four synchronization bursts in a time division multiple access (TDMA) multi-frame wherein each burst is of a length N and wherein N is of a value up to 156. The value of 156 is utilized when the dotting sequence is transmitted pursuant to a Group Special Mobile (GSM) communication scheme. In other embodiments, the bursts are of other lengths, that is to say, N is of other values.

Figure 3:
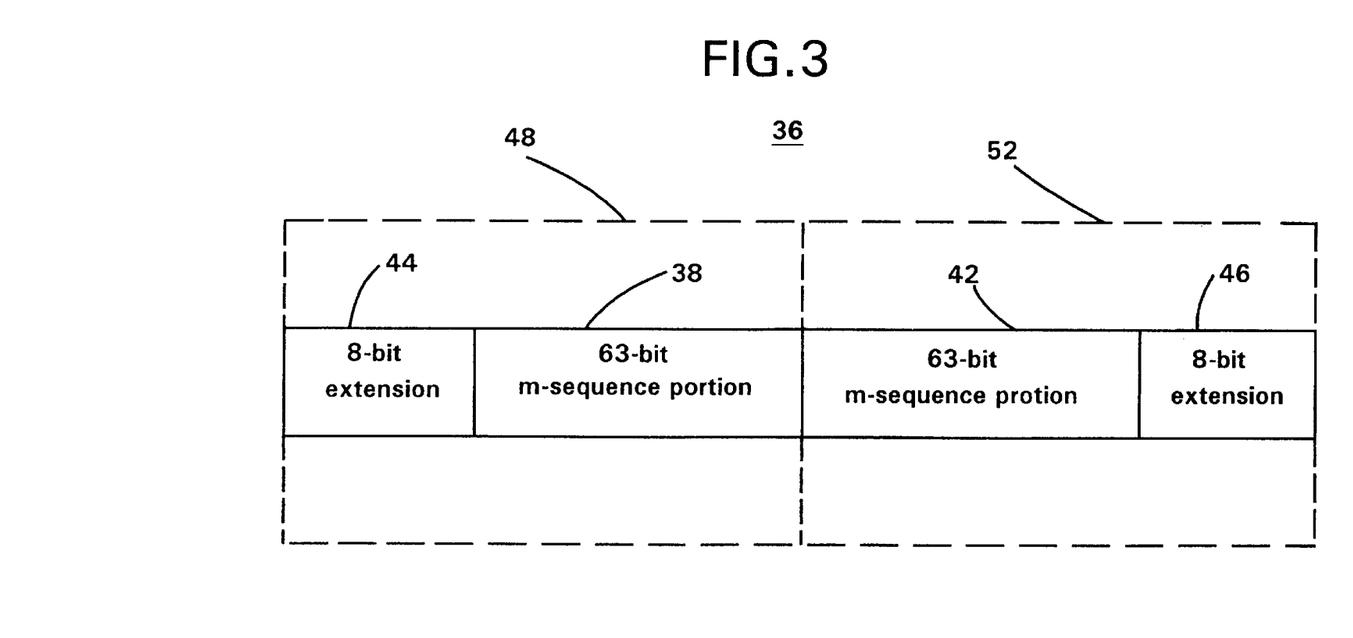
FIG. 3 illustrates a set of m-sequences which form the synchronization sequence of another embodiment of the present invention.

FIG. 3 illustrates the format of a set of m-sequences, shown generally at 36, of an alternate embodiment of the present invention. The set of m-sequences form the synchronization sequences which, when transmitted to a user terminal, permits effectuation of synchronization of the user terminal. The set 36 includes two identical m-sequence portions 38 and 42, here, each of sixty-three bit lengths. The portion 42 is concatenated to portion 38. Each of the m-sequences 38 and 42 each further include eight bit extensions 44 and 46, respectively. The m-sequences 38 and 42 are identical with one another and can be considered to be formed of first and second portions 48 and 52 wherein the portions 48 and 52 are identical with one another. The extensions 44 and 46, not necessarily of identical values, are used for fine synchronization procedures. The m-sequence 38 and the extension 44 together form a portion 48 and the m-sequence 42 and the extension 52 together form a portion 52 of the set 36 and concatenated together.

Figure 4:
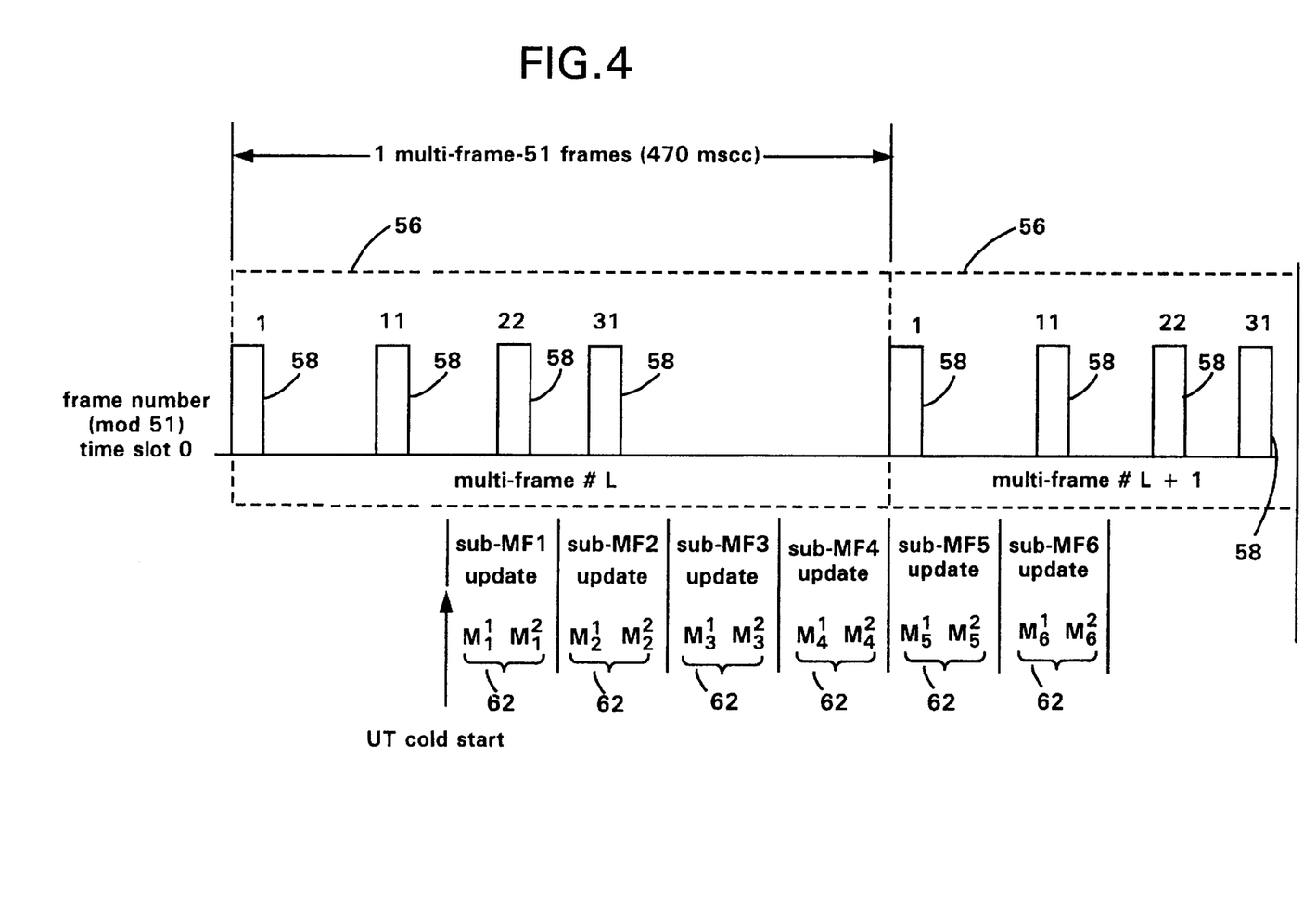
FIG. 4 illustrates the format of a control signal which includes synchronization sequences.

FIG. 4 illustrates a formatting scheme of a control signal of which the synchronization sequences, such as the dotting sequence 26 or the set of m-sequences 36 shown in FIGS. 2 and 3, respectively, form portions. The synchronization sequences are transmitted during selected time slots to form portions of the control signal transmitted to the user terminal 24. The formatting scheme illustrated in FIG. 4 is exemplary, and other manners by which to format a control signal transmitted to a user terminal can alternately be formed.

The control signal is formed of digitally-encoded symbol bits which are modulated and transmitted sequentially. Adjacent groups of symbol bits define slots of data. Adjacent slots of data define frames of data. Adjacent groups of frames define multi-frames. In FIG. 3, portions of two multi-frames 56 are illustrated. Each multi-frame 56 is formed of fifty-one frames of which four frames 58 are illustrated in the figure, namely, the first, eleventh, twenty-second, and thirty-first frames of the multi-frames 56 are illustrated in the figure. In one embodiment of the present invention, the synchronization sequences are transmitted during the first time slot of such four frames 58 of each multi-frame 56. Each frame 58 is divided into eight time slots (not separately shown in the figure).

For reasons which shall be described more fully below, each multi-frame 56 is also divided into sub-multi-frames 62; each sub-multi-frame 62 is of a substantially similar length. The sub-multi-frames 62 are of lengths, and the frames 58 containing synchronization sequences are spaced-apart from one another by separation distances such that no more than one frame 58 containing a synchronization sequence is positioned within a sub-multi-frame 62. Also, the frames 58 containing synchronization sequences are spaced-apart from one another by dissimilar separation distances which, shall be noted below, facilitate the determination of the location of the synchronization sequence within the multi-frame 56 subsequent to detection of the synchronization sequence.

Figure 5:
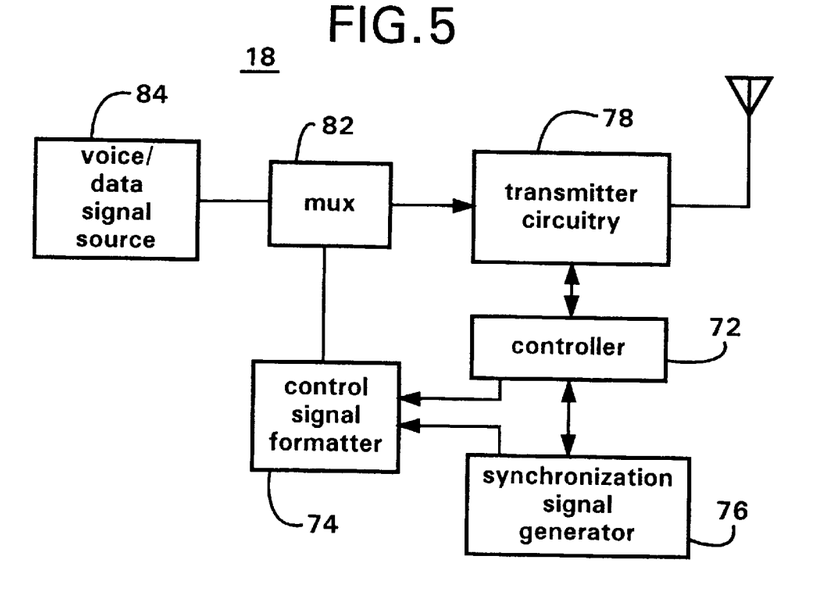
FIG. 5 illustrates a functional block diagram of network control circuitry which generates the control signal formatted pursuant to the structure illustrated in FIG. 4.

FIG. 5 illustrates the network control center 18, shown previously in FIG. 1, in greater detail. The network control center is operable, inter alia, to generate the control signal formatted, for example, in the manner of the formatting scheme illustrated in FIG. 4. Pursuant to such operation, the network control center generates and inserts synchronization sequences into the control signal. The control signal generated by the network control center is transmitted to a user terminal, such as the user terminal 24 shown in FIG. 1, by way of a satellite-based transceiver, such as the transceiver 22. The network control center 18 includes a controller 72 which controls operation of the control center 18. The controller 72 controls operation of a control signal formatter 74 which, while shown functionally, in one embodiment, is formed of algorithms executable by processing circuitry, such as the processing circuitry of the controller 72.

The controller 72 is further coupled to a synchronization signal generator 76 which is operable to generate synchronization signals, such as those illustrated in FIGS. 2 and 3. In one embodiment of the present invention, the synchronization signal generator 76 is also formed of algorithms executable by processing circuitry, such as the processing circuitry of the controller 72. The control signal formatter is operable to format the control signal which is generated by the network control center 18 and which includes the synchronization signals generated by the synchronization signal generator 76. The control signal formatted by the formatter 74 is applied to transmitter circuitry 78, here by way of a multiplexer 82. The transmitter circuitry is operable, responsive to control commands generated by the controller 72 to transmit the control signal formatted by the control signal formatter 74. The multiplexer 82 is further coupled to a voice/data signal source 84 to alternately transmit voice or data signals.

When operable to generate the control signal formatted according to, for example, the format set forth in FIG. 4, frames of control data are transmitted, and selected ones of the frames include synchronization sequences generated by the synchronization signal generator 76.

Figure 6:
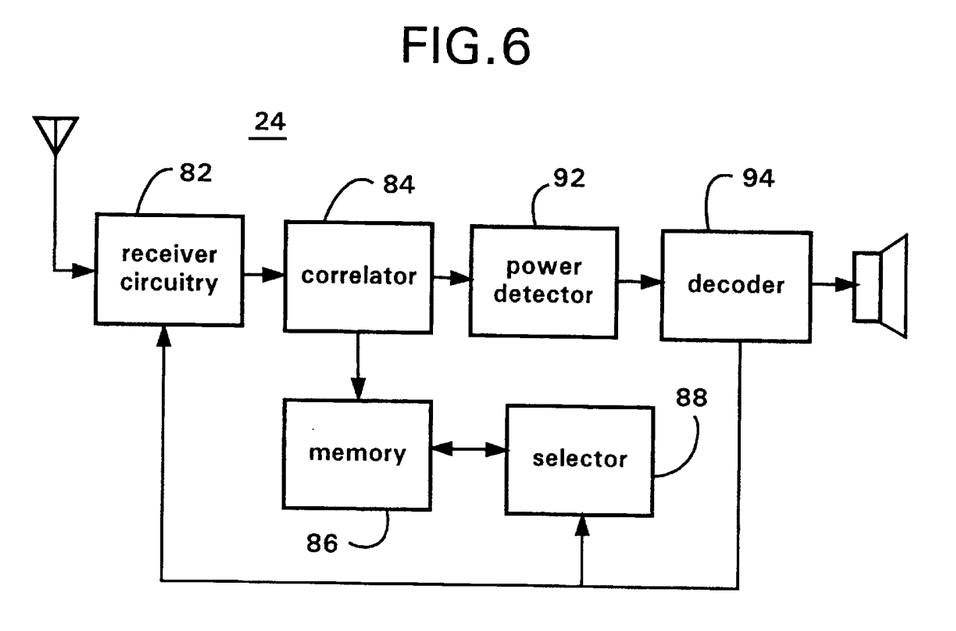
FIG. 6 illustrates a functional block diagram of a user terminal of an embodiment of the present invention.

FIG. 6 illustrates the user terminal 24, shown previously in FIG. 1, which is operable to receive control signals transmitted thereto, such as the control signals generated by the network control center 18 shown in FIG. 5. The user terminal 24 includes receiver circuitry 82 tunable to receive signals transmitted to the user terminal. Signals representative of the receive signals are applied to a correlator 84 which correlates portions of the signals applied thereto. Operation of the correlator 84 in the various embodiments of the present invention shall be described more fully below. Values of selected correlations performed by the correlator 84 are stored in a memory element 86. A selector 88 is operable to select portions of the signal applied to the correlator 84 having values of correlation which indicate the correlated portions to form synchronization sequences such as the synchronization sequences illustrated in FIGS. 2 and 3. Responsive to such selection, synchronization of the user terminal 24 with a network device which transmits signals thereto is effectuated.

The user terminal 24 is further shown to include a power detector 92 and a decoder 94, operable in conventional manner.

Figure 7:
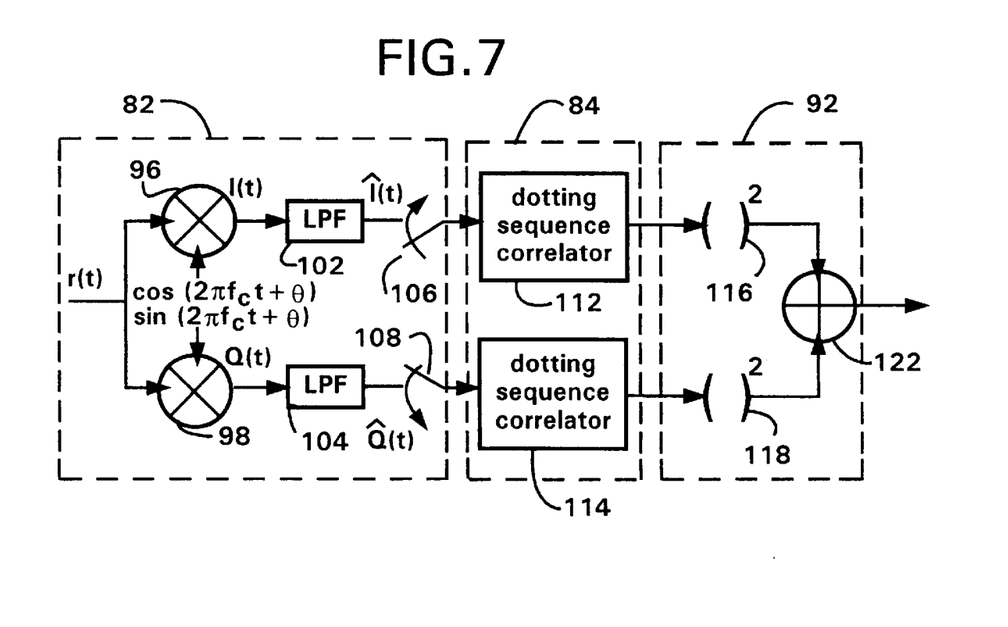
FIG. 7 illustrates another functional block diagram of a user terminal of an embodiment of the present invention.

FIG. 7 illustrates portions of the user terminal 24, shown in FIG. 6, in greater detail, namely, portions of the receiver circuitry 82, the correlator 84, and the power detector 92 are again illustrated. A receive signal, r(t), received at the user terminal is split into I and Q components by way of mixers 96 and 98, in conventional manner. The I and Q components are applied to low pass filters 102 and 104, respectively. The filtered signals generated by the filters 102 and 104 are sampled by signal samplers 106 and 108, respectively, and the sampled signals $R_n$ are applied to correlator portions 112 and 114. Once correlated, the sampled signal portions are applied to the power detector 92, here shown to be formed of energy squares 116 and 118 and a combiner 122.

In an embodiment in which the synchronization sequence is formed of a dotting sequence 26, shown previously in FIG. 2, the dotting sequence is inserted into selected frames of the control signal transmitted to the user terminal. By way of example, the format scheme illustrated in FIG. 4 shall be used to explain operation of an embodiment of the present invention by which the user terminal 24 is synchronized with a network station which transmits control signals including the dotting sequence to the user terminal. The user terminal 24 locates each of the four dotting sequence bursts to within a time period of +/- $T_s/2$ of error, where $T_s$ is a slot duration of each of the time slots during which the dotting sequence is transmitted. As indicated by the circuitry illustrated in FIG. 7, the filtered baseband receive signal is sampled by the samplers 106 and 108 to form an observation vector of link N and is correlated with the dotting sequence. Because the dotting sequence forms the synchronization sequences, correlation can be performed very simply by utilizing the characteristics of the dotting sequence.

$R_n$, at times n and n+1 can be represented by:

$$R_n = (r_{n-N+1}, r_{n-N+2}, \ldots, r_{n-1}, r_n)$$
$$R_{n+1} = (r_{n-N+2}, r_{n-N+3}, \ldots, r_n, r_{n+1})$$

Wherein:
$r_n$ is the sample of the filtered, received signal at time nT, and
T is the bit interval.

By further defining D to be the dotting sequence, the correlation $C_n$ of the observation vector at time n and the dotting sequence can be represented by:

Wherein:
T denotes a transpose, and $$C_n = R_n D^T$$
$$= \sum_{i=1}^{N/2} r_{n-N-2i-1} - \sum_{i=1}^{N/2} r_{n-N+2i}$$

N is assumed to be even.

The correlation of the observation vector $R_n$ at time n+1 and the dotting vector at the same time is represented by:

$$C_{n+1} = R_{n+1} D^T$$
$$= \sum_{i=1}^{N/2} r_{n-N+2i} - \sum_{i=1}^{N/2} r_{n-N+2i+1}$$
$$= -(C_n - r_{n-N+1}) - r_{n+1}$$
$$= r_{n-N+1} - (C_n + r_{n+1})$$

Therefore, the correlation at time n+1 can be calculated from the correlation, $C_n$, in two steps or operations. Also, when the observation vector comprises the dotting sequence, i.e., when $R_n = D$, $C_n = N$. Thereby, a processing gain of N is available.

Figure 8:
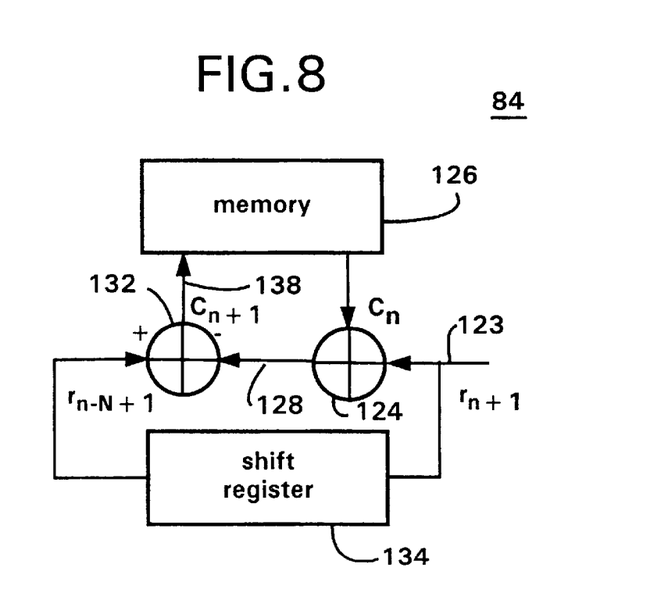
FIG. 8 illustrates a functional block diagram of a dotting sequence correlator which forms a portion of the user terminals shown in FIGS. 6 and 7 according to an embodiment of the present invention.

FIG. 8 illustrates the correlator 84, here a dotting sequence correlator, operable to perform the calculations of the correlation noted above. The correlator 84 receives a sampled signal on line 123 which is coupled to a summing device 124 to which an output of a memory 126 is also coupled. The summer 124 generates an output signal on the line 128 which is applied to an input of a second summer 132.

Line 123 is also coupled to a shift register 134 having an output which is coupled to a second input of the second summer 132. An output signal generated on line 138 is coupled to an input of the memory 126. As signal samples are applied to the correlator, values of the correlation are sequentially determined by the correlator 84. When a synchronization sequence formed of a dotting sequence is applied to the correlator 84, the value of the correlation determined by the correlator 84 increases.

Synchronization of the user terminal 24 with a network station when the synchronization sequences are formed of sets of m-sequences, such as the set 36 shown in FIG. 3 is also effectuated by correlating receive signal portions, here with a stored synchronization word, formed of an m-sequence. When the user terminal is turned on, windows of symbol bits of data are buffered in a memory device. When, for example, the m-sequence portions 38 and 42 are of sixty-three bit lengths, the window is of a length of sixty-three symbol bits. The correlator 84 calculates all sixty-three correlations with each cyclic-shift of the stored, m-sequence. When the m-sequence portions are of other bit lengths, the number of calculations performed by the correlator 84 correspondingly changes. Once all of the correlations have been calculated, the window slides sixty-three samples, and a new window of symbol bits is buffered and correlated. Again, when the m-sequence portions are of other bit lengths the window slides a correspondingly changed number of samples.

As each synchronization burst is formed of two m-sequence portions, portions 38 and 42, a sliding window of data eventually buffers a full m-sequence formed, if not of a single one of the m-sequence portions, of parts of the set of m-sequences 36, together to form a single m-sequence portion. A correlation of such a window of symbol bits with the stored m-sequence exhibits a high level of correlation. While correlating such a received sequence in which an m-sequence is of a sixty-three bit length in conventional manner requires sixty-three minus one additions and approximately $63^2$ (actually, 63×62) operations, a utilization of a Fast Hadamard Transformer (FHT), the required number of operations to perform a correlation is decreased significantly. Through use of the FHT, only $63\log_2(63)$ operations are required in order to obtain 63 correlations. That is to say, each correlation of each window of buffered symbol bits requires only $\log_2 (63)$ calculations. An exemplary Hadamard sequence correlation operation follows. The exemplary operation pertains to an m-sequence of a length of 7 for purposes of simplicity. Analogous such operations can, of course, be similarly shown for m-sequences of other lengths, e.g., sixty-three. The m-sequence of the following example is formed of (1, -1, -1, -1, 1, 1,-1). A matrix formed of seven cyclic shifts of such sequence is as follows:

$$M = \begin{bmatrix} 1 & -1 & -1 & -1 & 1 & 1 & -1 \\ -1 & -1 & -1 & 1 & 1 & -1 & 1 \\ -1 & -1 & 1 & 1 & -1 & 1 & -1 \\ -1 & 1 & 1 & -1 & 1 & -1 & -1 \\ 1 & 1 & -1 & 1 & -1 & -1 & -1 \\ 1 & -1 & 1 & -1 & -1 & -1 & 1 \\ -1 & 1 & -1 & -1 & -1 & 1 & 1 \end{bmatrix}$$

where each row of the matrix is a cyclic shift of the m-sequence. By designating a sample within a sliding window to be $R_t=(r_t^1, \ldots r_t^7)$, $MR_t$ produces seven correlations.

By adding an additional all-one row and an all-one column to the matrix M, a new matrix $\hat{M}$ is designated as follows:

$$\hat{M} = \begin{bmatrix} 1 & 1 & 1 & 1 & 1 & 1 & 1 & 1 \\ 1 & 1 & -1 & -1 & -1 & 1 & 1 & -1 \\ 1 & -1 & -1 & -1 & 1 & 1 & -1 & 1 \\ 1 & -1 & -1 & 1 & 1 & -1 & 1 & -1 \\ 1 & -1 & 1 & 1 & -1 & 1 & -1 & -1 \\ 1 & 1 & 1 & -1 & 1 & -1 & -1 & -1 \\ 1 & 1 & -1 & 1 & -1 & -1 & -1 & 1 \\ 1 & -1 & 1 & -1 & -1 & -1 & 1 & 1 \end{bmatrix}$$

$$= [\underline{C}_1, \underline{C}_2, \underline{C}_3, \underline{C}_4, \underline{C}_5, \underline{C}_6, \underline{C}_7, \underline{C}_8]$$

By re-ordering the columns of $\hat{M}$, a new matrix $\tilde{M}$ is defined as follows:

$$\tilde{M} = [\underline{C}_1, \underline{C}_2, \underline{C}_6, \underline{C}_7, \underline{C}_8, \underline{C}_4, \underline{C}_5, \underline{C}_3]$$

$$= \begin{bmatrix} 1 & 1 & 1 & 1 & 1 & 1 & 1 & 1 \\ 1 & 1 & 1 & 1 & -1 & -1 & -1 & -1 \\ 1 & -1 & 1 & -1 & 1 & -1 & 1 & -1 \\ 1 & -1 & -1 & 1 & -1 & 1 & 1 & -1 \\ 1 & -1 & 1 & -1 & -1 & 1 & -1 & 1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \end{bmatrix}$$

$\tilde{M}$ is a matrix formed of eight Hadamard sequences. Correlations with the eight cyclic shifts of such m-sequences can be calculated by:

1. reorder $R_t$ to get $\tilde{R}_t=(0, r_t^1, r_t^2, r_t^7, r_t^8, r_t^4, r_t^5, r_t^3)$.
2. calculate $\tilde{M} \tilde{R}_t$ by fast Hadamard transform.

Thereby sixty-three correlations are obtained by $(63+1) \log_2 (63+1)$ operations. A reduction in the required number of operations to obtain the sixty-three correlations is reduced by a factor $63/\log_2(63+1)$.

As multiple numbers of correlations are performed to synchronize the user terminal 24 with a network station which transmits control signals to the user terminal a manner by which to reduce the numbers of correlation values stored during operation of the synchronization process facilitates the synchronization process. During coarse synchronization, each multi-frame 56 includes four synchronization sequence bursts. In the formatting scheme illustrated in FIG. 4, the synchronization sequences form portions of the first, eleventh, twenty-second, and thirty-first frames. As also mentioned previously with respect to FIG. 4, the multi-frames 56 are subdivided into sub-multi-frames 62 wherein each sub-multi-frame includes no more than one burst of a synchronization sequence. By such an arrangement, when the user terminal is turned on, the user terminal calculates the correlation at each sampling time and stores the largest K correlation values and their corresponding time indexes in each sub-multi-frame in a memory device, such as the memory element 86 shown in FIG. 6. A sorting algorithm is utilized in an embodiment of the present invention to more efficiently utilize the available memory of the memory device.

In an embodiment in which the synchronization sequence is formed of a dotting sequence, such as the dotting sequence 26, $C_n$ is approximately equal to $C_{n+1}$ when N is a large value. Thus, when a correlation value $C_n$ due to noise is greater than the correlation $C_m$ due to the presence of a dotting sequence burst, it is at least somewhat likely that the correlation $C_{n+1}$ and $C_{n-1}$ are both greater than $C_m$. As a result, when the value of K is small, meaning that only a few memory locations are used per sub-multi-frame, it is possible that all of the K largest correlations in a sub-multi-frame are all due to noise correlations positioned closely to one another in time. To exclude such values of correlation due to noise, only the largest correlation within a window of $\delta_T$ is stored within the memory element. The value of $\delta_T$ is optimized to facilitate correlation and, hence, synchronization, procedures.

Figure 9:
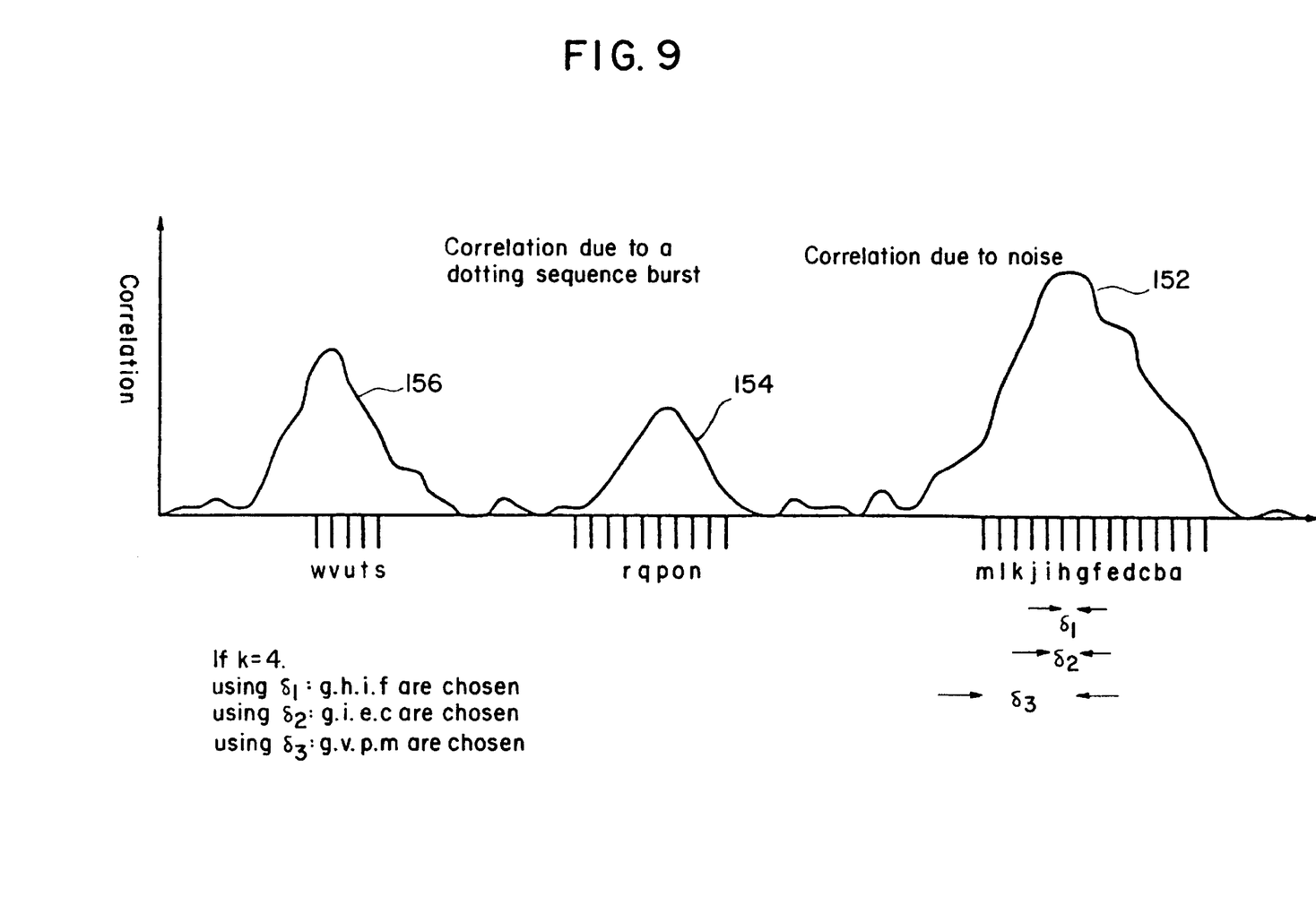
FIG. 9 illustrates levels of correlation calculated during operation of an embodiment of the present invention plotted as a function of time.

FIG. 9 illustrates correlations of exemplary signals received by the user terminal 24. In the exemplary illustration, levels of correlation determined at the user terminal are plotted as a function of time. Two areas, areas 152 and 154 exhibit increased levels of correlation, but such increased levels of correlation are due to noise introduced upon a signal received at the user terminal. A fourth area, area 156 is of an increased level of correlation due to the reception at the user terminal of the synchronization sequence, here a dotting sequence burst. If the size of the $\delta_T$ is small, and only K memory locations are utilized to store values of correlation, correlation values due to noise and not to reception of a synchronization sequence might be stored.

FIG. 9 illustrates $\delta_T$ of three sizes, $\delta_1, \delta_2, \delta_3$. When $\delta_T$ is of a size of $\delta_1$ correlation values corresponding to the values of correlation at times g, h, i, and j are stored when K equals four. The time indices g, h, i, and j and their corresponding correlation values are both stored. When $\delta_T=\delta_2$, correlation values corresponding to the value of correlation at times g, i, e, and c. And, when $\delta_T=\delta_3$, correlation values of the values of correlation at times g, v, t, and m and such time indices are stored. Hence, when the measurement window is increased, correlation levels due to noise are less likely to prevent storage of a correlation value due to reception of a synchronization sequence.

When the synchronization sequence is formed of a set 36 of m-sequences as shown in FIG. 3, the largest correlation value and its corresponding coordinate within each sliding window is detected. If the current, greatest correlation value is greater than the smallest correlation value stored in the memory element, the smallest correlation value and its coordinate are replaced by the newly-determined level of correlation and its coordinate.

Once the values of correlation and their respective time indices have been determined and stored, the boundary of the multi-frames 56 are determined responsive to the stored values of correlation and their corresponding coordinates. After determining the largest K correlation values, as described, and their corresponding time index coordinates for each of the six sub-multi-frames 62 each of the stored coordinate time indexes is hypothesized to be the trailing edge of the k-th synchronization sequence bursts of a multi-frame 56. That is to say, each of the stored coordinates is analyzed to determine whether the stored coordinate corresponds to the first, eleventh, twenty-second, or thirty-first frame. The stored coordinate time indexes are hypothesized to be the trailing edges of such frames because the largest correlation value is obtained when the entire coarse synchronization burst has entered the correlator 84. As the spacings between the frames in which the coarse synchronization sequences are known, each hypothesis is analyzed to determine whether the neighborhood of subsequent time coordinate indices are stored at expected locations. Details of the analysis shall be described more fully below with respect to the equation defining a decision statistic in terms of an indicator function. If such coordinate time indices are stored, their correlation values are accumulated. The hypothesis having the largest accumulation value is chosen to form the maximum likelihood hypothesis. Responsive thereto, all down-link control channels are located, thereby effectuating synchronization of the user terminal.

As mentioned above with respect to the description of operation of the various embodiments of the present invention to determine and store the largest values of correlation, the largest values of correlation and their corresponding coordinate time indices are stored in a memory element, such as the memory element 86 shown in FIG. 6. $M^1$ and $M^2$ represent the memory locations of the memory element. Both $M^1$ and $M^2$ are formed of six rows and K columns and store the largest correlation values and the corresponding coordinate time indices, respectively. The contents of the i-th row and the j-th column of a memory location k is denoted as $M_{i,j}^k$, where k=1 or 2. $M_1$ is referred to as the "metrics" table and $M^2$ is referred to as the "coordinates" table.

With reference again to the formatting scheme illustrated in FIG. 4, exemplary operation of an embodiment of the present invention, including storage of correlation values and their corresponding coordinate time indices, shall be described. For purposes of example, the user terminal is turned on as the fifteenth frame of the multi-frame 56 is received at the user terminal. Hence, one coarse synchronization sequence burst shall be noted in the first sub-multi-frame 62, the second sub-multi-frame 62, the fifth sub-multi-frame 62, and the sixth sub-multi-frame 62. And, no synchronization sequences shall be noted in the third and fourth sub-multi-frames 62.

During the coarse synchronization procedure, the user terminal calculates the coarse synchronization sequence correlation for each bit position of an entire multi-frame 56. However, sorting is effectuated over only the same sub-multi-frame 62. The metrics table $M^1$ and the coordinates table $M^2$ are updated sequentially according to a memory updating algorithm, which shall be described below.

Figure 10:
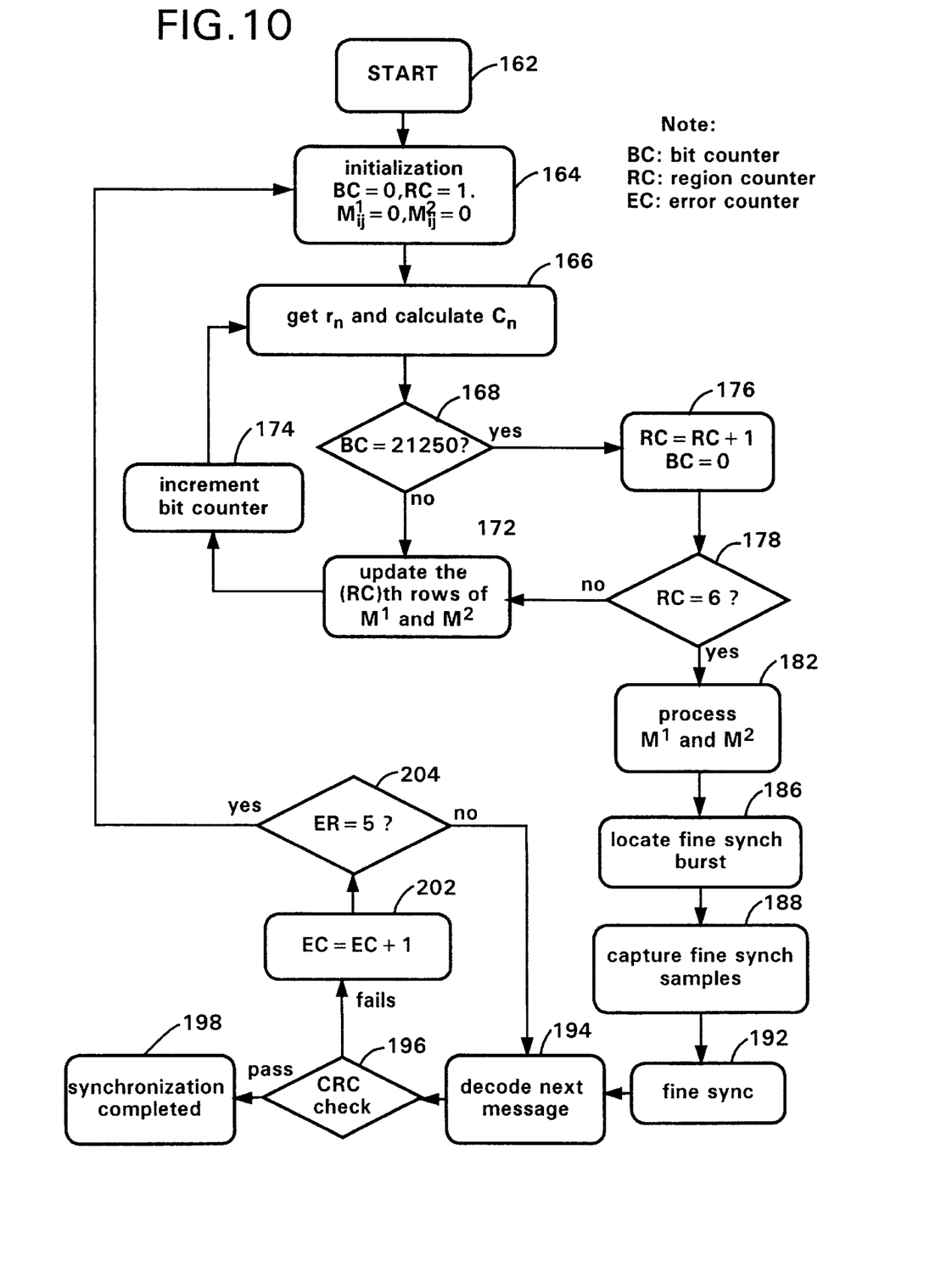
FIG. 10 illustrates a logical flow diagram of the method of operation of an embodiment of the present invention.

FIG. 10 illustrates the method of an embodiment of the present invention by which to synchronize a user terminal by transmitting a control signal thereto which includes synchronization sequences formed of sets of m-sequences, such as the set 36 shown in FIG. 3. After entry into the method, as indicated by the block 162, initialization occurs, as indicated by the block 164. Set $M_{i,j}^k=0 \forall i,j$ and k. Furthermore, reset the bit counter (BC), region counter (RC), and error counter (EC).

Then, and as indicated by the block 166, a new sample of $r_n$ is obtained, a new observation vector $R_n$, and a new correlation value $C_n$ is calculated. Then, and as indicated by the decision block 168, a determination is made as to whether the bit counter is of a value of 21,250 which corresponds to the total number of bits in a sub-multi-frame. If not, the no branch is taken to block 172 and the rows of $M^1$ and $M^2$ are updated according to the following rules:
1. If $C_n > M_{1,1}^1$ and $|n - M_{1,1}^2| \leq \delta_T$ for some window size $\delta_T$, $M_{1,1}^1 = C_n$ and $M_{1,1}^2 = n$.
2. If $C_n > M_{1,1}^1$ and $|n - M_{1,1}^2| > \delta_T$, $M_{1,1}^1 = C_n$, $M_{1,1}^2 = n$ and $M_{1,k}^1 = M_{1,k-1}^1$ and $M_{1,k}^2 = M_{1,k-1}^2$, for k=2 ..., K.
3. If $M_{1,j}^1 < C_n < M_{1,j-1}^1$ and $|n - M_{1,j-1}^2| \leq \delta_T$, no updating (for j=2 ..., K).
4. If $M_{1,j}^1 < C_n < M_{1,j-1}^1$, $|n - M_{1,j-1}^2| > \delta^T$, and $|n - M_{1,j}^2| \leq \delta_T$, $M_{1,j}^1 = C_n$, $M_{1,j}^2 = n$ (for j=2 ..., K).
5. If $M_{1,j}^1 < C_n < M_{1,j-1}^1$, $|n - M_{1,j-1}^2| > \delta_T$, and $|n - M_{1,j}^2| > \delta_T$, $M_{1,j}^1 = C_n$, $M_{1,j}^2 = n$ and $M_{1,k}^1 = M_{1,k-1}^1$, $M_{1,k}^2 = M_{2,k-1}^1$, for k=j-2 ..., K.
6. If $C_n < M_{1,k}^1$, no updating.

m-sequence method:
1. Find $\max\{C_n\}$, which is the largest correlation within the sliding window.
2. If $\max C_n > M_{1,1}^1$, $M_{1,1}^1 = \max C_n$, $M_{1,1}^2 = \text{argmax} C_n$, and $M_{1,k}^2 = M_{1,k-1}^2$, for k=2 ..., K.
3. If $M_{1,j}^1 < \max C_n < M_{1,j-1}^1$, $M_{1,j}^1 = \max C_n$, $M_{1,j}^2 = \text{argmax} C_n$, and $M_{1,k}^1 = M_{1,k-1}^1$, $M_{1,k}^2 = M_{2,k-1}^1$, for k=j-2 ..., K.
4. If $\max C_n < M_{1,K}^1$, no updating.

Then, the bit counter is incremented as indicated by the block 174. In an embodiment in which the synchronization sequence is formed of the dotting sequence, the bit counter is incremented by one bit. In an embodiment in which the synchronization sequence is formed of m-sequences, the bit counter is incremented by the length of the m-sequence, here sixty-three bits.

The operations of block 166 are repeated for all six sub-multi-frames 62. In each repetition, different rows of memory are utilized. If the yes branch is taken from the decision block 168, the region counter is incremented and the bit counter is reset, as indicated by the block 176. Thereafter, a determination is made, as indicated by the decision block 178 as to whether the region counter is of a value of six. If not, the no branch is taken back to block 172, thereby to effectuate the six repetitions of the calculations of the block 166.

If the yes branch is taken from the decision block 178, processing of the metrics and coordinate tables is effectuated. Such processing is effectuated by the above-mentioned hypothesis process. Namely, each element of $M^2$, $M_{i,j}^2$, will be hypothesized as the trailing edge of the k-Th synchronization sequence burst and a decision statistics $H_{i,j}^k$ will be calculated based on this hypothesis. Let $s_{i,j}$ be the spacing, in terms of the number of bits, between the i-th coarse synch sequence burst of a multi-frame and the j-th subsequent coarse synch sequence burst. Then $$S_{i,j} = \begin{bmatrix} 25000 & 52500 & 75000 \\ 27500 & 50000 & 102500 \\ 22500 & 75000 & 100000 \\ 52500 & 77500 & 105000 \end{bmatrix}$$

The decision statistics $H_{i,j}^k$ can be calculated by $$H_{i,j}^k = M_{i,j}^1 + \sum_{m=1}^{3} \sum_{n=1}^{6} \sum_{l=1}^{K} I(|M_{k,j}^2 + s_{k,m} - M_{n,l}^2| \leq \delta_T) M_{n,l}^1$$

where I(x) is the indicator function, which is 1 when X is true and 0 when X is false. The argument of I(·) in the above equation indicates whether $M_{n,1}^2$ is in the neighborhood of expected coarse synch sequence burst locations. If it is true, the correlation value $M_{n,1}^{-1}$ is added.

If $H_{i,j}^{k}$ is the largest decision statistics, the location of the first coarse synchronization sequence burst, e.g., the dotting sequence or the m-sequence shown in FIG. 2 and 3, is estimated as $M_{i,j}^{2}+I(k\neq 1)s_{k,5-k}$.

Thereafter, and as indicated by the block 186, the m-sequence burst is located, and the fine synchronization samples are captured as indicated by the block 188.

Thereafter, fine synchronization is performed, as indicated by the block 192. In one embodiment, utilization of a split m-sequence procedure is preferred over utilization of a dotting sequence procedure for purposes of fine synchronization as the extensions 44 and 46 of the set 36 shown in FIG. 3 create a sequence of full burst length having good autocorrelation properties to facilitate the fine synchronization process. Subsequent to the fine synchronization process, a next High Power Broadcasting Message is decoded, as indicated by the block 194, a CRC check is performed as indicated by the decision block 196. If the CRC check passes, the "pass" branch is taken and synchronization is completed, as indicated by the block 198. Otherwise, the "fail" branch is taken to the block 202, the error counter is incremented, and a determination is made at the decision block 204 whether the error counter has reached a selected value, here a value of five. If not, the no branch is taken back to block 194; otherwise, the yes branch is taken back to block 164.

The coarse synchronization procedure requires that the receive signal be coherently added. Therefore, frequency error has to be resolved to a certain degree to yield an appropriate coarse synchronization performance. If a local oscillator of the user terminal has +/−2.5 ppm offset, the possible frequency error at 1.6 GHz is ±4 kHz. Therefore, we can divide ±4 kHz into L frequency bins, each of 8000/L Hz width, and have L parallel operations as described in the previous subsection.

Figure 11:
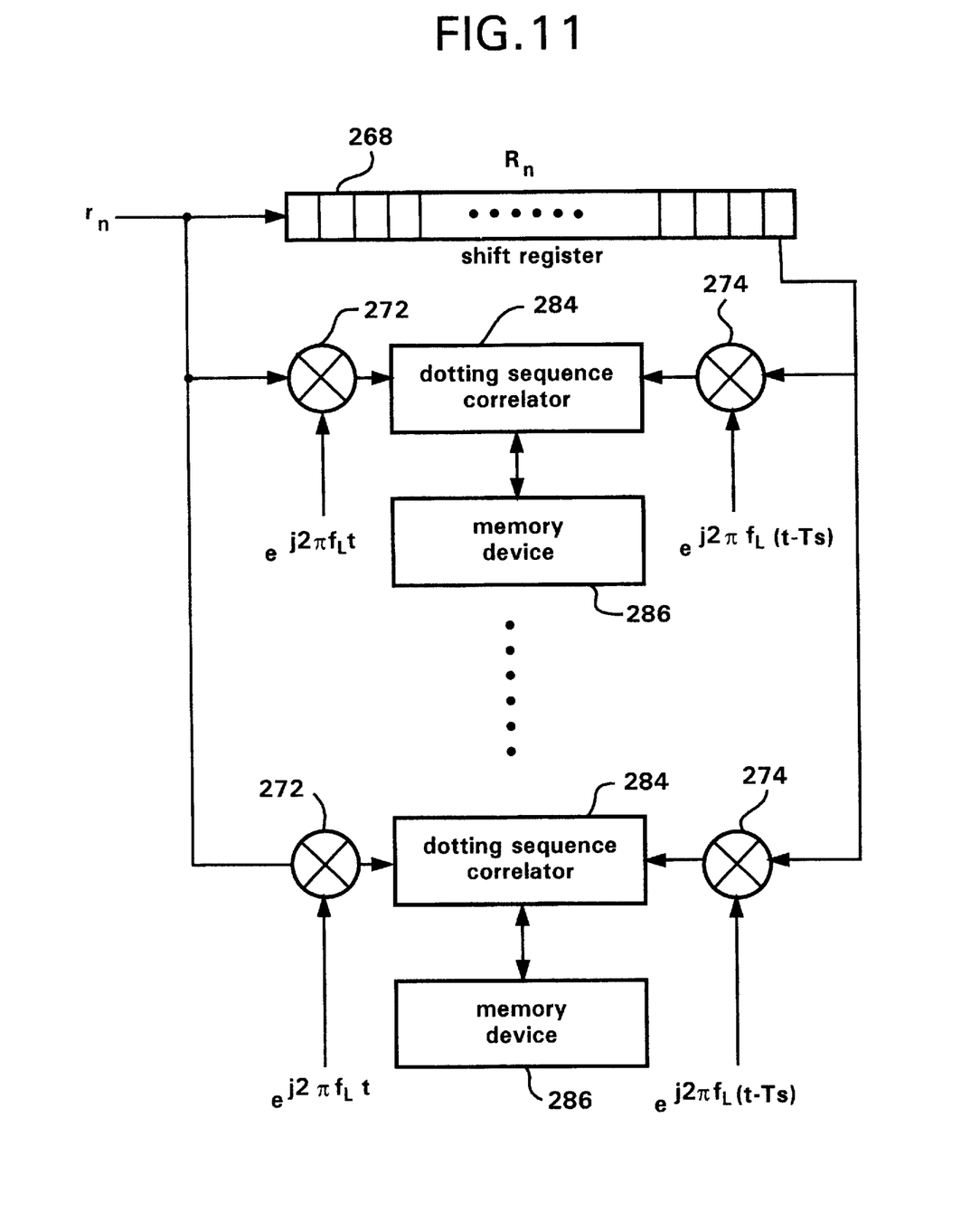
FIG. 11 illustrates a functional block diagram of circuitry of an embodiment of the present invention for resolving frequency error during synchronization of a user terminal with a synchronization sequence formed of a dotting sequence transmitted thereto.

Such a parallel operation is shown in FIG. 11 for a dotting sequence embodiment. In FIG. 11, to compensate for the frequency offset, the received sample, $r_n$ is first de-rotated before it is fed into the correlator. In addition, to reduce the amount of memory required for dotting sequence method, instead of storing the de-rotated sampled values, the plain sample value, $r_n$, is stored. However, to get $C_{n+1}$ from $C_n$ the derotated $r_{n-N-1}$ has to be subtracted from $C_n$. Therefore, a total of 2L complex multipliers are required to provide L dotting sequence correlators for L frequency bins.

As illustrated in FIG. 11, symbol bits $r_n$ are applied to a shift register 268 and to a plurality, here L, of different mixers 272. The mixers 272 correspond to the mixing elements 96 and 98 shown previously in FIG. 7. Outputs of the shift register 268 are applied to a corresponding plurality of mixers 274. Second inputs to each of the mixers 272 and 274 are signals of different frequencies $f_1$ and $f_2$. Mixed signals generated by each of the mixers 272 and 274 are applied to correlators 284, which here are formed of the circuitry of the correlator 84 and power detector 92 shown previously in FIG. 7. The correlators 284 are each further coupled to memory devices 286.

Each of the correlators perform correlations, the calculations of which are described above with respect to FIG. 7. The memory devices store values of $C_n$, used to perform such calculations. Because of the different frequency signals applied to the mixers 272 and 274, correlations performed by one of the correlators shall exhibit increased levels of correlation relative to others, thereby to compensate best for the frequency offset.

Figure 12:
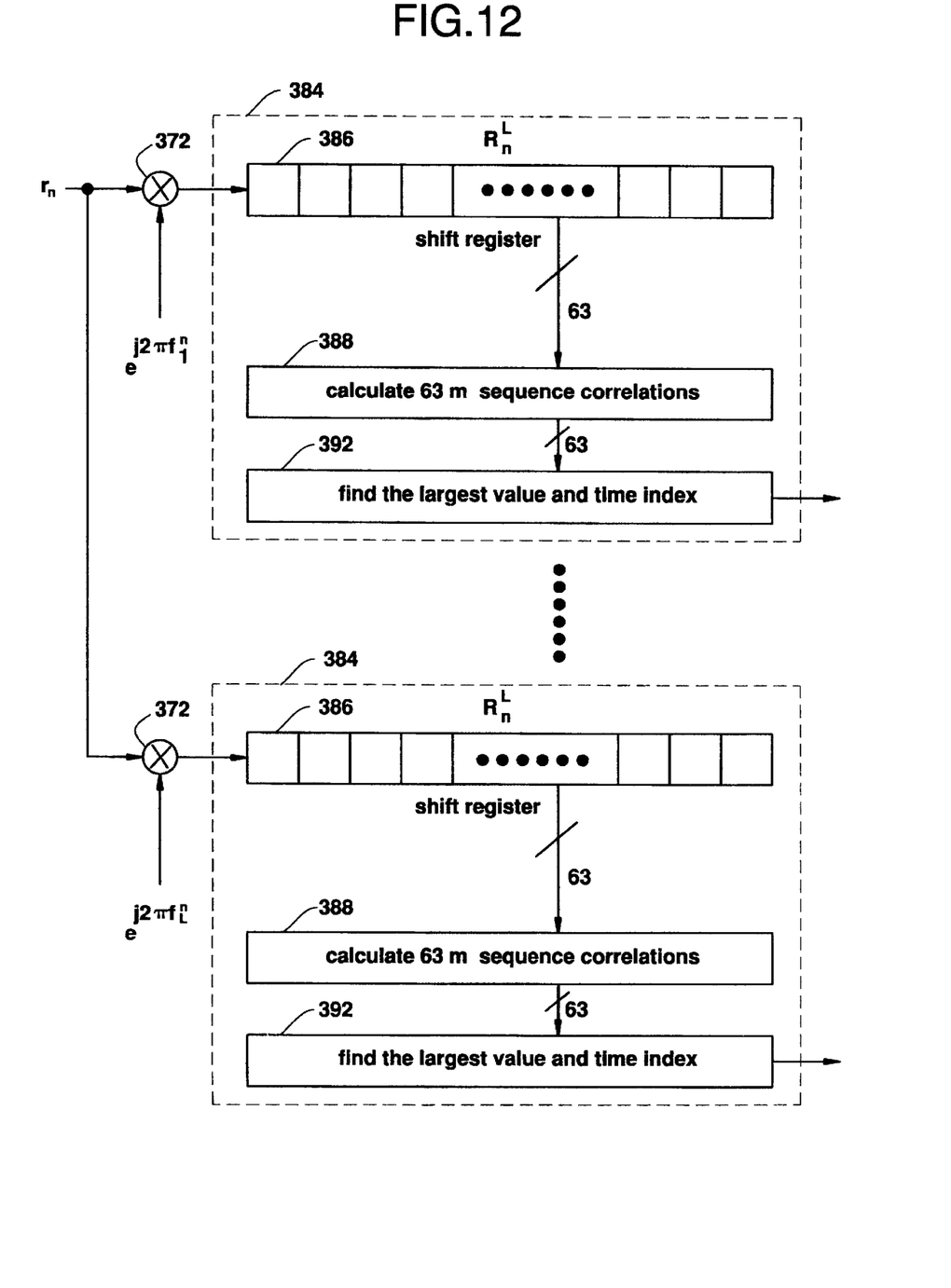
FIG. 12 illustrates a functional block diagram, similar to that shown in FIG. 11, but of circuitry of an embodiment of the present invention for resolving frequency error during synchronization of a user terminal with a synchronization sequence formed of a set of m-sequences.

FIG. 12 illustrates an embodiment of the present invention by which to correct for frequency error when the synchronization sequences are formed of m-sequences, such as the set 36 shown in FIG. 3 above. Here, the symbol bits $r_n$ are applied to inputs of a plurality, here L, of mixers 372. The mixers 372 correspond to the mixing elements 96 and 98 shown previously in FIG. 7. Second inputs to each of the mixers 372 are signals of different frequencies $f_1$ through $f_L$. Mixed signals generated by each of the mixers 372 are applied to correlators 384 which here are formed of the circuitry of the correlator 84 and power detector 92 shown previously in FIG. 7.

Each of the correlators is here shown to include a shift register 386 into which, here, sixty-three samples are shifted. Once the samples are shifted into the shift register, sixty-three m-sequence correlation calculations are performed, as indicated by the block 388. Once the sixty-three correlations have been calculated, as indicated by the block 392, the largest value of correlation and its associated time index are determined. Because of the different frequency signals applied to the correlators 384, correlations performed by one of the correlators shall exhibit increased levels of correlation relative to others of the correlators, thereby to compensate best for the frequency offset.

Because the synchronization sequences are detected by a user terminal by a correlation process of reduced numbers of computations, synchronization of the user terminal is effectuated quickly. Synchronization sequences are also of high margin to facilitate their detection by a receiver even when the sequences are transmitted upon a communication channel subjected to high levels of attenuation or multi-path distortion. Accordingly, utilization of the synchronization method and apparatus is particularly advantageous in a cellular communication system, either a terrestrial-cellular communication system or a satellite-cellular communication system.

The previous descriptions are of preferred examples for implementing the invention, and the scope of the invention should not necessarily be limited by this description. The scope of the present invention is defined by the following claims.

What is claimed is:

1. A method for synchronizing a receiver with a transmitter, the receiver and the transmitter coupled together by way of a communication channel, said method comprising the steps of:

transmitting, from the transmitter, a control signal upon the communication channel, the control signal formatted pursuant to a selected format and including synchronization sequences, each synchronization sequence formed of a first synchronization portion and a second synchronization portion concatenated thereto and substantially identical therewith;

detecting, at the receiver, the control signal transmitted during said step of transmitting;

correlating portions of the control signal detected at the receiver; and selecting, at the receiver, portions of the control signal exhibiting, during said step of correlating, increased levels of correlation, the portions of the control signal exhibiting the increased levels of correlation being the synchronization sequences formatted to form portions of the control signal, thereby to synchronize the receiver with the transmitter and the control signal transmitted therefrom.

2. The method of claim 1 wherein the control signal transmitted during said step of transmitting comprises frames of symbol bits, each frame divided into slots of fixed time-lengths, and groups of frames defining multi-frames.

3. The method of claim 2 wherein the synchronizing sequences forming portions of the control signal are transmitted as portions of selected ones of the frames, the selected ones of the frames of which the synchronizing sequences form portions being offset from one another by dissimilar numbers of frames according to the selected format pursuant to which the control signal is formatted.

4. The method of claim 3 wherein said step of selecting further comprises determining frame locations of the synchronization sequences formed of the portions of the control signal exhibiting the increased levels of correlation.

5. The method of claim 4 wherein said step of correlating further comprises storing correlation values, and positional coordinates of selected portions of the control signal.

6. The method of claim 5 wherein the correlation values of the correlations of the selected portions stored during said step of storing comprise correlations which are of greatest values within selected time periods.

7. The method of claim 6 wherein the selected time periods define time windows and wherein no more than one of the correlation values and the positional coordinates stored during said step of storing are within any one time window.

8. The method of claim 6 wherein said selected time periods correspond to fractional, sub-multi-framal portions of the multi-frames, the sub-multi-framal portions of framelengths and the dissimilar numbers of frames separating the synchronizing sequences such that no more than one synchronizing sequence is transmitted during each sub-multi-framal portion.

9. The method of claim 8 wherein a first number of synchronizing sequences are transmitted during each multi-frame and each multi-frame is formed of a second number of sub-multi-framal portions, the second number greater than the first number.

10. The method of claim 1 wherein the synchronization sequences forming portions of the control signal transmitted during said step of transmitting comprise dotting sequences, and wherein the first synchronization portion and the second synchronization portion comprise substantially identical bit-length, dotting sequence portions.

11. The method of claim 10 wherein said step of correlating comprises correlating overlapping portions of the control signal detected during said step of detecting.

12. The method of claim 10 wherein said step of correlating comprises determining differences of signal values of successive bit symbols and previously-determined correlation values.

13. The method of claim 1 wherein the synchronization sequences forming portions of the control signal transmitted during said step of transmitting each comprise a set of two m-sequences, and wherein the first synchronization portion and the second synchronization portion each comprise one of the two m-sequences.

14. The method of claim 13 wherein said step of correlating comprises correlating nonoverlapping portions of the control signal detected during said step of detecting.

15. The method of claim 13 wherein said step of correlating comprises the steps of: buffering selected sequential portions of the control signal detected during said step of detecting, storing a receiver-stored sequence of values corresponding to an m-sequence of the set of m-sequences, and correlating the selected sequential portions buffered during said step of buffering with the receiver-stored sequence.

16. The method of claim 15 wherein said step of correlating further comprises storing correlation values, and positional coordinates thereof, of correlations of a selected number of greatest values.

17. The method of claim 16 wherein said step of correlating comprises the further step of replacing a correlation value of the correlation values stored during said step of storing the correlation values when a selected sequential portion buffered during said step of buffering exhibits a greater value of correlation than at least one of the selected number of correlation values of the greatest values stored during said step of correlating.

18. In a communication system having a first communication station and a second communication station, the first and second communication stations, respectively, coupled together by way of a communication channel, a combination with the first and second communication stations of circuitry for synchronizing the second communication station with the first communication station, said circuitry comprising:

a control signal generator positioned at the first communication station, said control signal generator for generating and transmitting a control signal upon the communication channel, the control signal formatted pursuant to a selected format and including synchronization sequences, each synchronization sequence formed of a first synchronization portion and a second synchronization portion concatenated thereto and substantially identical therewith;

a control signal detector positioned at the second communication station, said control signal detector for detecting the control signal generated and transmitted by said control signal generator;

a correlator coupled to said control signal detector, said correlator for correlating portions of the control signal detected by said control signal detector; and a selector coupled to said correlator, said selector for selecting portions of the control signal exhibiting increased levels of correlation, the portions of the control signal exhibiting the increased levels of correlation being the synchronization sequences formatted to form portions of the control signal, thereby for synchronizing the second communication station with the first communication station.

19. A receiver synchronizable with a transmitter, said receiver comprising:

a control signal detector for detecting transmission of a control signal thereto, the control signal transmitted by the transmitter, the control signal formatted pursuant to a selected format and including synchronization sequences, each synchronization sequence formed of a first synchronization portion and a second synchronization portion concatenated thereto and substantially identical therewith;

a correlator coupled to said control signal detector, said correlator for correlating portions of the control signal detected by said control signal detector; and a selector coupled to said correlator, said selector for selecting portions of the control signal exhibiting increased levels of correlation, the portions of the control signal exhibiting the increased levels of correlation being the synchronization sequences formatted to form portions of the control signal, thereby for synchronizing the receiver station with the transmitter.

20. A method for synchronizing a receiver with a transmitter, the receiver and transmitter coupled together by way of a communications channel, said method comprising the steps of:

transmitting, from the transmitter, a control signal upon the communications channel, the control signal including synchronization sequences;

detecting, at the receiver, the control signal transmitted during said step of transmitting;

correlating portions of the control signal detected at the receiver; and selecting, at the receiver, portions of the control signal exhibiting, during said step of correlating, increased levels of correlation, the portions of the control signal exhibiting the increased levels of correlation being synchronization sequences within the control signal, thereby to synchronize the receiver with the transmitter and the control signal transmitted therefrom.

* * * * *